United States Patent
Fischer et al.

(10) Patent No.: US 10,144,043 B2
(45) Date of Patent: *Dec. 4, 2018

(54) DEVICES AND METHODS FOR LANDFILL GAS WELL MONITORING AND CONTROL

(71) Applicant: Q.E.D. Environmental Systems, Inc., Dexter, MI (US)

(72) Inventors: David A. Fischer, Ann Arbor, MI (US); David Mioduszewski, Dexter, MI (US)

(73) Assignee: Q.E.D. Environmental Systems, Inc., Dexter, MI (US)

(*) Notice: Subject to any disclaimer, the term of this patent is extended or adjusted under 35 U.S.C. 154(b) by 84 days.

This patent is subject to a terminal disclaimer.

(21) Appl. No.: 14/698,424

(22) Filed: Apr. 28, 2015

(65) Prior Publication Data

US 2015/0275632 A1 Oct. 1, 2015

Related U.S. Application Data

(63) Continuation of application No. 13/794,242, filed on Mar. 11, 2013, now Pat. No. 9,062,536.
(Continued)

(51) Int. Cl.
*B09B 1/00* (2006.01)
*E21B 43/12* (2006.01)
(Continued)

(52) U.S. Cl.
CPC ............ *B09B 1/006* (2013.01); *B09B 3/0016* (2013.01); *E21B 34/02* (2013.01); *E21B 43/12* (2013.01);
(Continued)

(58) Field of Classification Search
CPC ................................. B09B 1/006; E21B 34/02
See application file for complete search history.

(56) References Cited

U.S. PATENT DOCUMENTS

| 4,026,355 A | 5/1977 | Johnson et al. |
| 4,159,893 A | 7/1979 | Ham |

(Continued)

FOREIGN PATENT DOCUMENTS

| CN | 1682009 A | 10/2005 |
| CN | 1748072 A | 3/2006 |

(Continued)

OTHER PUBLICATIONS

Supplementary European Search Report for corresponding European Patent Application No. EP13870001 dated Aug. 24, 2016, 7 pages.

(Continued)

*Primary Examiner* — John J Kreck
(74) *Attorney, Agent, or Firm* — Harness, Dickey & Pierce, P.L.C.

(57) ABSTRACT

The present disclosure relates to a self-regulating, landfill well control system for automatically controlling a flow of landfill gas (LFG) through a wellhead associated with a landfill well at a landfill. The system has a combination unit operably associated with the wellhead, with a valve actuator, a flow measurement element and a controller. The valve actuator controls a LFG flow control valve, to thus control an LFG flow through the wellhead. The flow measurement element produces differential pressures proportional to a LFG flow rate. The controller controls the valve actuator and, based on data obtained using the flow measurement element, adjusts a setting of the LFG flow control valve to obtain a specific control point setting, and automatically maintains the control point setting thereafter.

18 Claims, 7 Drawing Sheets

Related U.S. Application Data (60) Provisional application No. 61/748,370, filed on Jan. 2, 2013.

(51) Int. Cl.
  *E21B 44/00* (2006.01)
  *B09B 3/00* (2006.01)
  *E21B 34/02* (2006.01)
  *E21B 47/00* (2012.01)
  *H04B 1/3827* (2015.01)
  *H04W 4/80* (2018.01)

(52) U.S. Cl.
  CPC .............. *E21B 44/00* (2013.01); *E21B 47/00* (2013.01); *H04B 1/3833* (2013.01); *H04W 4/80* (2018.02)

(56) References Cited

U.S. PATENT DOCUMENTS

| | | | |
|---|---|---|---|
| 4,444,041 A | 4/1984 | Zison | |
| 4,770,676 A | 9/1988 | Sircar et al. | |
| 4,890,672 A | 1/1990 | Hall | |
| 5,063,519 A | 11/1991 | Zison | |
| 5,311,851 A | 5/1994 | Wright, Jr. | |
| 5,355,739 A | 10/1994 | Cooper et al. | |
| 5,373,897 A * | 12/1994 | Skarvan | E21B 43/121 166/250.03 |
| 5,611,844 A | 3/1997 | Troost et al. | |
| 5,616,841 A * | 4/1997 | Brookshire | B09B 1/00 138/44 |
| 5,695,641 A | 12/1997 | Cosulich et al. | |
| 5,706,896 A | 1/1998 | Tubel et al. | |
| 5,983,164 A | 11/1999 | Ocondi | |
| 6,169,962 B1 | 1/2001 | Brookshire et al. | |
| 6,356,205 B1 | 3/2002 | Salvo et al. | |
| 6,393,821 B1 | 5/2002 | Prabhu | |
| 6,446,014 B1 | 9/2002 | Ocondi | |
| 6,591,695 B1 | 7/2003 | Brookshire et al. | |
| 6,799,477 B2 | 10/2004 | Brookshire et al. | |
| 6,999,883 B1 | 2/2006 | Brady et al. | |
| 7,056,537 B2 | 6/2006 | Weschler | |
| 7,198,433 B2 | 4/2007 | Augenstein et al. | |
| 7,448,828 B2 | 11/2008 | Augenstein et al. | |
| 7,591,866 B2 | 9/2009 | Bose | |
| 7,704,291 B2 | 4/2010 | Bose | |
| 7,731,779 B2 | 6/2010 | Palumbo | |
| 7,878,250 B2 | 2/2011 | Sheldon | |
| 7,972,082 B2 | 7/2011 | Augenstein et al. | |
| 8,021,612 B2 | 9/2011 | Tooley | |
| 8,155,764 B2 | 4/2012 | Castelijns et al. | |
| 8,163,242 B2 | 4/2012 | Elkins | |
| 8,168,121 B2 | 5/2012 | Elkins | |
| 8,186,211 B2 | 5/2012 | Boult et al. | |
| 8,944,014 B2 * | 2/2015 | Cutlip | E21F 7/00 123/3 |
| 9,062,536 B2 * | 6/2015 | Fischer | B09B 1/006 |
| 2001/0005812 A1 * | 6/2001 | Brookshire | B09B 1/00 702/6 |
| 2007/0225923 A1 * | 9/2007 | Tooley | G05B 13/048 702/47 |
| 2008/0154510 A1 | 6/2008 | Scott | |
| 2010/0145636 A1 | 6/2010 | Nyfors | |
| 2011/0179349 A1 | 7/2011 | Rogers et al. | |
| 2011/0231099 A1 * | 9/2011 | Elkins | B09B 1/00 702/12 |
| 2011/0231109 A1 | 9/2011 | Furuhashi et al. | |
| 2012/0191349 A1 | 7/2012 | Lenz et al. | |
| 2012/0206715 A1 | 8/2012 | Laub | |
| 2012/0297868 A1 | 11/2012 | Elkins | |
| 2013/0270006 A1 | 10/2013 | Selman et al. | |
| 2013/0275047 A1 | 10/2013 | Selman et al. | |
| 2014/0182846 A1 | 7/2014 | Fischer et al. | |

FOREIGN PATENT DOCUMENTS

| | | |
|---|---|---|
| CN | 201100122 Y | 8/2008 |
| CN | 102896131 A | 1/2013 |
| CN | 203145904 U | 8/2013 |
| KR | 20120023267 A | 3/2012 |
| WO | 2004034196 A2 | 4/2004 |

OTHER PUBLICATIONS

International Search Report and Written Opinion for corresponding International Application No. PCT/US2016/026440, dated Jul. 19, 2016, 15 pages.

PCT International Search Report and Written Opinion issued in corresponding International Application No. PCT/US2013/077508, dated Apr. 18, 2014, 14 pages.

Watson, Anne; "Landfill: The Little Landfill that Could," Waste360.com; Aug 1, 2002, (pp. 1-3); http://waste360.com/mag/waste_little_landfill.

SIPO 1st Office Action and Search Report issued in Chinese Patent Application No. 2013800691342, dated Aug. 14 2017, 11 pages.

\* cited by examiner

DEVICES AND METHODS FOR LANDFILL GAS WELL MONITORING AND CONTROL

CROSS-REFERENCE TO RELATED APPLICATIONS

This application is a continuation of U.S. application Ser. No. 13/794,242, filed Mar. 11, 2013, which claims the benefit of U.S. Provisional Application No. 61/748,370, filed on Jan. 2, 2013. The entire disclosures of the each of the above applications are incorporated herein by reference.

FIELD

The present disclosure relates to a system and method for monitoring gas produced by landfills.

BACKGROUND

This section provides background information related to the present disclosure which is not necessarily prior art.

Active and inactive domestic solid waste landfills in the United States require the installation of systems to control and capture methane produced by the anaerobic processes breaking down the waste. Safety, gas capture for energy use, and greenhouse gas control because methane has 25 times the greenhouse gas impact of CO2, are some of the reasons these systems are installed. Additionally, regulations govern methane gas emissions for air pollution and safety reasons. While some landfills employ passive flare systems to burn off the methane, the present trend is to employ controlled systems that use a vacuum pump, piping and wells to draw the methane to a central location at the landfill site for use generating electricity or for gas recovery.

Data is currently collected from the numerous extraction points such as gas well heads, often as frequently as once a week. A typical landfill may consist of approximately 50 to several hundred wells and well heads. The frequency of data collection, combined with the number of data collection points, creates a large, multivariate data set that grows over time. This data known as landfill gas (LFG) data is typically stored in spreadsheets or enterprise level environmental databases. Current data use focuses on flagging exceedences, some charting and some data trend mapping as related to GPS location of the well points. Control decisions at each well head are primarily based on fixed "rules" and tend not to utilize LFG data from historical data sets. Additionally, the analysis of historical data sets for time and space trends and relationships are not used to create control modification recommendations such as positioning of control valves at the well heads.

SUMMARY

In one aspect the present disclosure relates to a self-regulating, landfill well control system for automatically controlling a flow of landfill gas (LFG) through a wellhead associated with a landfill well at a landfill. The system may comprise a combination unit operably associated with the wellhead. The combination unit may have a valve actuator, a flow measurement element and a controller. The valve actuator may be operable to control a LFG flow control valve, to thus control a LFG flow through the wellhead. The flow measurement element is operably associated with the wellhead and produces differential pressures proportional to a LFG flow rate. The controller controls the valve actuator and, based on data obtained using the flow measurement element, adjusts a setting of the LFG flow control valve to obtain a specific control point setting, and automatically maintains the control point setting.

In another aspect the present disclosure relates to a self-regulating, landfill well control system for automatically controlling a parameter associated with a wellhead associated with a landfill well at a landfill, and where a landfill gas (LFG) is flowing through the wellhead. The system may comprise a combination unit operably associated with the wellhead. The combination unit may have a valve actuator, a measurement element and a controller. The valve actuator may be operable to control a LFG flow control valve associated with the valve actuator, to thus control a LFG flow through the wellhead. The measurement element may operate to measure the parameter to be controlled. The controller may operate to control the valve actuator, based on measurements obtained using the measurement element, and to adjust a setting of the LFG flow control valve to achieve a desired control point setting for the parameter, and to thereafter automatically adjust the LFG flow control valve as needed to maintain the desired control point setting for the parameter.

In still another aspect the present disclosure relates to a method for forming a self-regulating, landfill well control system for automatically controlling a parameter associated with a wellhead associated with a landfill well at a landfill, and where a landfill gas (LFG) is flowing through the wellhead. The method comprises using a valve actuator to control a LFG flow control valve, to thus control a LFG flow through the wellhead. A measurement operably associated with the wellhead is used to measure the parameter to be controlled. A controller is used to control the valve actuator and, based on data obtained using the measurement element, to adjust a setting of the LFG flow control valve to achieve a desired control point setting for the parameter. The controller may thereafter be used to automatically adjust the LFG flow control valve as needed to maintain the desired control point setting for the parameter.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
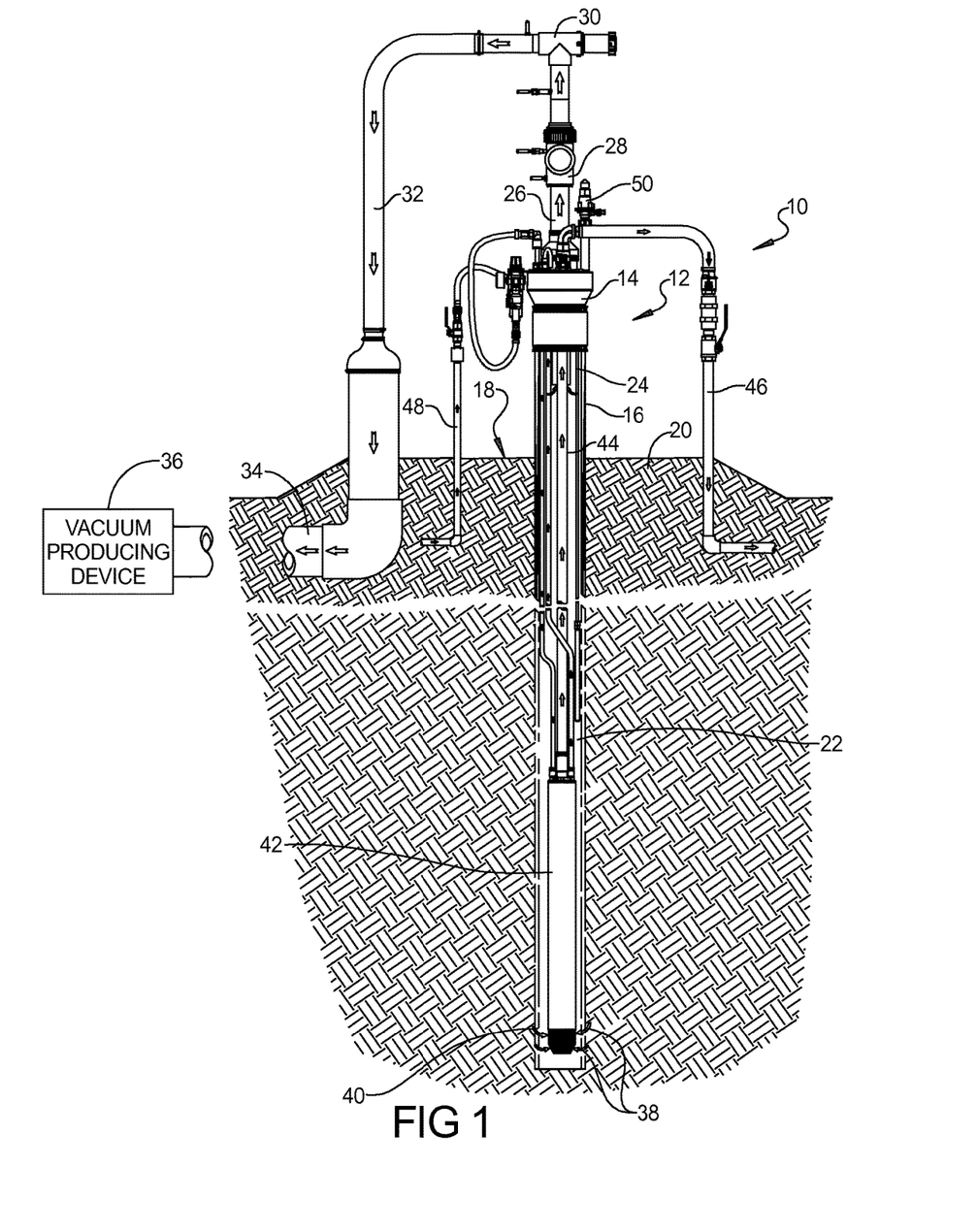
FIG. 1 is a partial cross sectional front elevational view of a landfill well assembly and associated equipment and piping having a control/operating system of the present disclosure.

Referring to FIG. 1, a typical landfill well system 10 includes a well head assembly 12 having a well head 14 mounted to a plastic well pipe 16, which is typically a six inch or eight inch pipe. Well pipe 16 can extend approximately three to four feet above a ground surface 18 of a multiple layer landfill gradient 20, or can be terminated at or below grade or ground surface 18 such that the well head 14 is positioned in a below-ground vault or enclosure. Well pipe 16 includes multiple holes 22 in a zone extending approximately thirty to over one hundred feet below the ground surface 18 that permit influx of landfill gas into the well pipe 16. Landfill gas (i.e., methane gas) is drawn into the collection well 16 into a well discharge pipe 24 that can include an above ground discharge pipe extension 26. The methane gas then passes through multiple components including an orifice assembly 28 used to measure gas flow rate, and a control valve 30 used to meter gas flow rates, and is transferred via a flow pipe 32 to a larger collection pipe 34. Collection pipe 34 is commonly connected to a vacuum producing device 36 which assists in drawing out the methane gas. Well head assembly 12 provides for, and landfill well system 10 can further include a plurality of influent apertures 38 near the bottom end of well pipe 16 that allow liquid known as "leachate" to collect at a well pipe foot. Before reaching apertures 38, the leachate may be discharged using a pump 42, via an in-well fluid discharge pipe 44 and an external well fluid discharge pipe 46. Other services provided by well head assembly 12 include an air inlet line 48 used to power the pump 42, and a well fluid level detector 50.

Figure 2:
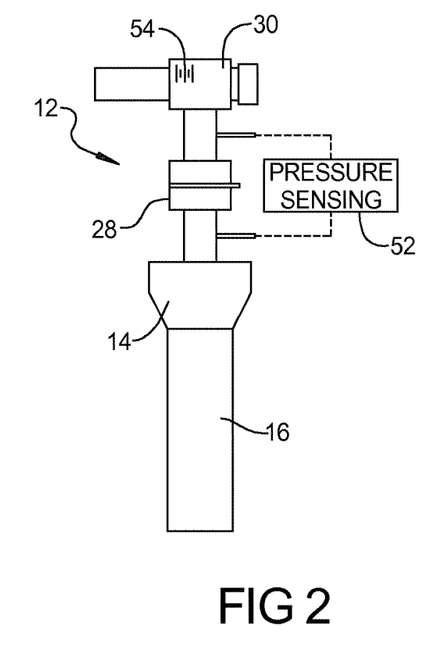
FIG. 2 is a front elevational view of a portion of the well head assembly and control valve control/operating system of FIG. 1.

Referring to FIG. 2, devices and methods to target the LFG well head assembly 12 include a flow control means in the form of flow control valve 30, a pressure gradient producing means in the form of orifice assembly 28 and a pressure drop measurement device 52. Flow control valve 30 is designed to create a repeatable and finely adjustable gas flow rate when controlling LFG flow outward from the well pipe 16 to the vacuum producing device 36. Flow control valve 30 can additionally have indexing marks 54 allowing a valve position to be recorded and enhance repeatability of the valve position for a given gas flow rate and/or for a given set of well operating parameters such as temperature, barometric pressure, humidity, and the like.

Figure 3:
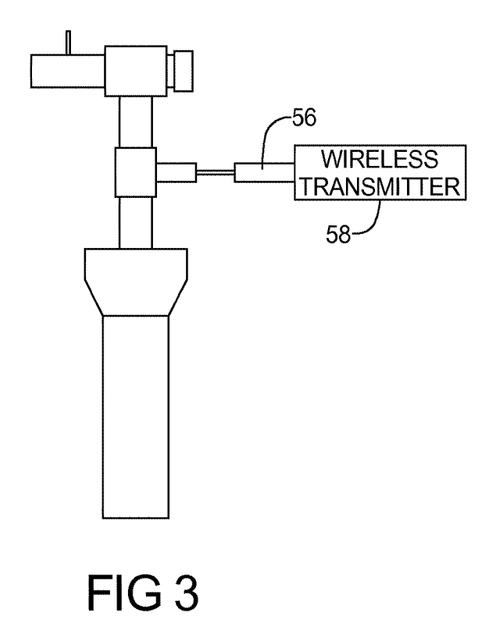
FIG. 3 is a front elevational view of a well head assembly and control valve control/operating system modified from FIG. 2.

Referring to FIG. 3, according to several aspects, a variation on the system of FIG. 2 is provided by the use of a mass flow rate device 56 for reading LFG flow rate. The mass flow rate device 56 is used in place of pressure drop measurement device 52. Mass flow rate device 56 can include a wireless transmitter 58 used to electronically send mass flow rate measurements remotely.

Figure 4:
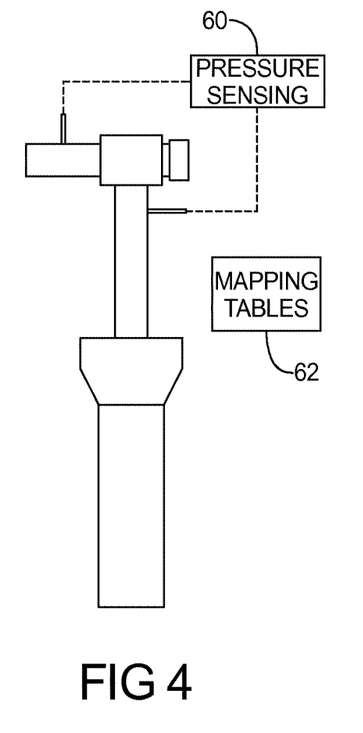
FIG. 4 is a front elevational view of a well head assembly and control valve control/operating system modified from FIG. 2.

Referring to FIG. 4, according to further aspects, a variation on the system of FIGS. 2 and 3 is to use a pressure drop measurement device 60 connected across the flow control valve 30 in combination with the flow control valve indexing marks 54 to provide and reproduce the LFG flow rate. A set of printed or electronic tables 62 or equations are used to map a relationship between the valve position of flow control valve 30 and the indicated differential pressure, resulting in a LFG flow rate measurement.

Figure 5:
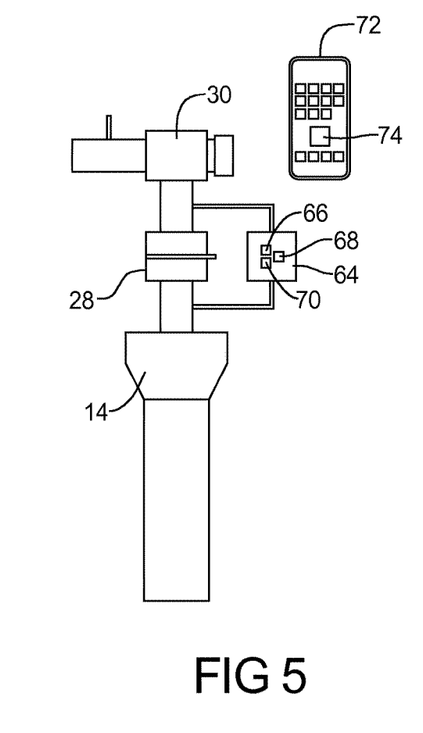
FIG. 5 is a front elevational view of a well head assembly and control valve control/operating system modified from FIG. 2.

Referring to FIG. 5, a further variation on the systems of FIGS. 2-4 is to use a differential measurement device 64, having an internal pressure transducer 66, a micro-controller 68 and a wired or wireless communications means 70 (such as but not limited to a suite of high level communication protocols using small, low-power digital radios based on an IEEE 802 standard for personnel area networks, or wireless technology standards for exchanging data over short distances (using for example short-wavelength radio transmissions in the ISM band from 2400-2480 MHz) from fixed and mobile devices, long range cellular radio, or the like) to send the differential pressure measured by differential measurement device 64 to a mobile hand-held device 72, such as a smart phone or tablet. The differential measurement device 64 can be used portably or can be dedicated to the LFG well head 14. Mobile hand-held device 72 can include a program 74 allowing the input of a pressure drop device specification. For example, for the system of FIG. 2, this could be an orifice size of the orifice assembly 28. As a further example, this could be the flow control device index position indicated by the indexing marks 54 of flow control valve 30, which allows calculation of LFG flow rate. Further, hand-held device 72 can also be used to identify or control a landfill gas quality such as methane, carbon dioxide, and/or oxygen levels.

Referring to FIG. 6 and again to FIGS. 1-5, the previous devices and methods can further include the sampling of other LFG data 76, as required. LFG data 76 can include LFG well head vacuum or pressure, LFG gas quality data, LFG gas temperature, site or ambient data readings such as barometric pressure, air temperature, and the like, and/or a geospatial location of the LFG well head 14.

Figure 6:
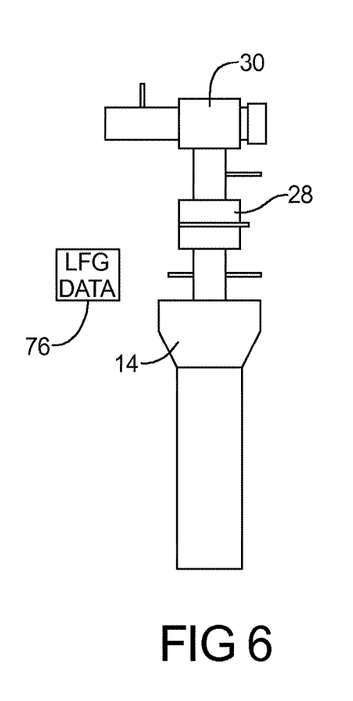
FIG. 6 is a front elevational view of a well head assembly and control valve control/operating system modified from FIG. 2.
Figure 7:
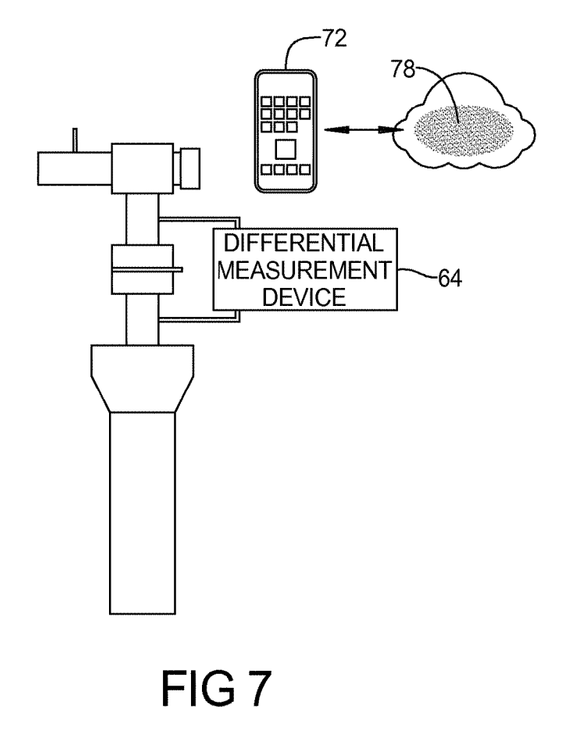
FIG. 7 is a front elevational view of a well head assembly and control valve modified from FIG. 2.

Referring to FIG. 7, the systems described in FIGS. 5 and 6 can be further expanded by providing a data storage device 78 in communication with the mobile hand-held device 72, such that historical data and other information is accessible in the data storage device 78 at the time new data is being acquired. In addition to basic data storage, various data processing techniques can be used to provide recommended flow control valve 30 position adjustments, in near real time, to optimize the LFG well operation toward achieving system goals, such as maximizing methane recovery and/or minimizing LFG migration. Location-specific historical data and analysis can be further expanded to include one or more nearby LFG well heads 14-14n and the details of each well head's historical readings and control set points.

Referring to FIG. 8 and again to FIGS. 1-7, a powered flow control device actuator 80 can be added to the flow control valve 30, thereby providing accurate and repeatable positioning of flow control valve 30. The addition of powered flow control device actuator 80 provides an "automatic indexing" of the flow control valve 30 position. Automatic valve indexing/positioning can be provided by an embedded micro-controller 82 and logic and/or portable mobile, wired or wireless device, such as mobile hand-held device 72, providing remote control of the communication enabled valve actuator 80.

Referring to FIG. 9 and again to FIGS. 1-8, a combination unit 84 having a valve actuator and flow measurement device, plus a micro-controller 86, at least one vacuum/pressure sensor 88, a LFG temperature sensor 90 and/or other measurable parameter sensors can be used to provide local, automatic valve position setting. Combination unit 84 can include various control and measurement schemes that are used to obtain a specific control point setting, such as maintaining set levels of landfill gas flow rate or setting levels of vacuum applied to the well. Combination unit 84 can additionally add the various data elements described in reference to FIG. 6 to provide further basis for control setting changes. Combination unit 84 can be controlled remotely for example from an off-site wireless device or satellite signal.

Figure 8:
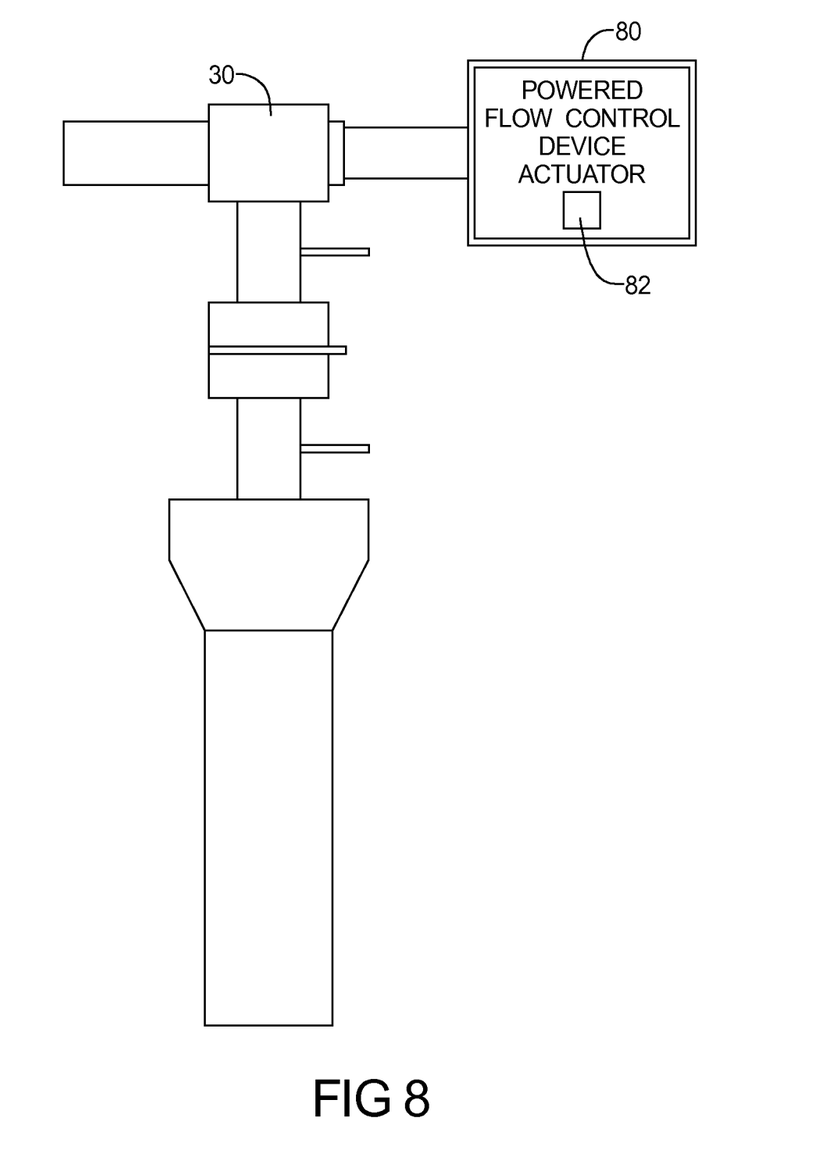
FIG. 8 is a front elevational view of a well head assembly and control valve control/operating system modified from FIG. 2.
Figure 9:
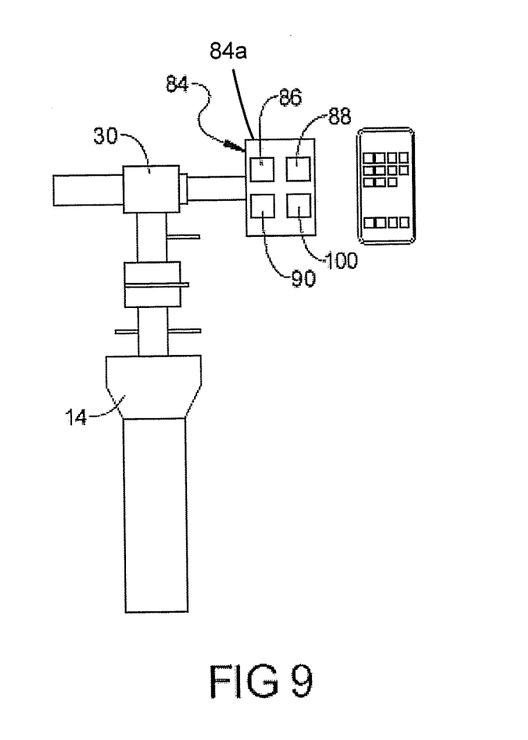
FIG. 9 is a front elevational view of a well head assembly and control valve control/operating system modified from FIG. 2.
Figure 10:
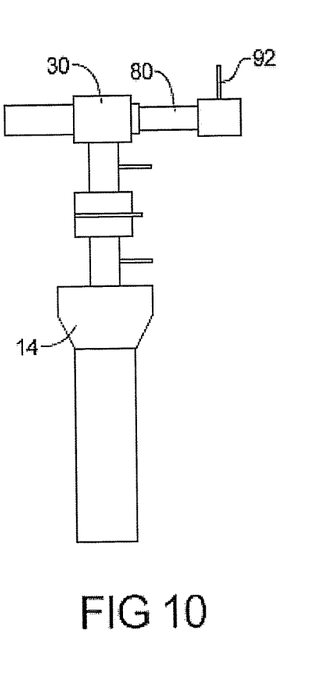
FIG. 10 is a front elevational view of a well head assembly and control valve control/operating system modified from FIG. 2.

Referring to FIG. 10 and again to FIGS. 2-9, the powered flow control device actuator 80 described in reference to FIG. 8 can be further provided with a wired or wireless communications device 92 to communicate and change the valve position with a mobile hand-held device, such as mobile hand-held device 72. Mobile hand-held device 72 can include a program to assist in valve settings. This combination allows the use of flow measurement, as described in reference to FIG. 6 to provide feedback for control changes. Additional data elements, as described in reference to FIGS. 6 and 9 can be integrated into the control logic.

Figure 11:
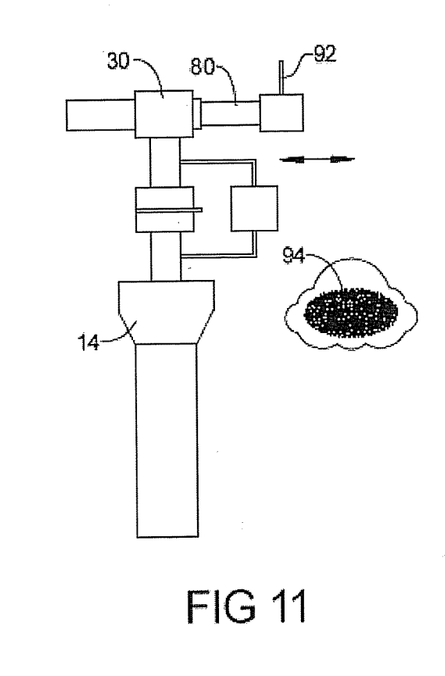
FIG. 11 is a front elevational view of a well head assembly and control valve control/operating system modified from FIG. 2.

Referring to FIG. 11 and again to FIGS. 1-10, data and control schemes can be as described in reference to FIG. 7, to include historical and "cloud data" enhanced elements 94. Additionally, embedded wireless communications device 92 is provided to the powered flow control device actuator 80, such that valve positioning can be accomplished remotely and therefore not require the mobile hand-held device 72. As described in reference to FIG. 10, wireless communications device 92 can be combined with additional data elements, as described in reference to FIG. 5, to provide the operator with context and feedback for control valve changes. In addition, remote access to historical multiple LFG well head data sets, LFG well head data for nearby and all site LFG well heads, advanced well head and site models, control algorithms, and the like as described in reference to FIG. 7 can optimize LFG control for the overall landfill site. Operator assisted control and potentially automatic control of the entire operating landfill are therefore provided. Simpler remote readout of LFG flow rate, valve position, vacuum, pressures, temperatures, and the like are also provided.

Referring to FIG. 12 and again to FIGS. 1-11, landfill well system 10 can provide a combination of self-regulating LFG wellhead gas flow control valve 30 that includes electronically controlled, powered flow control device actuator 80, a flow measurement element such as an orifice plate or pitot tube as orifice assembly 28 that produces differential pressures proportional to landfill gas flow rate, pressure sensors and/or transducers 66, a microprocessor 96 with control logic capability and the ability to communicate locally via a Bluetooth® protocol communications scheme or other local wireless signal to a mobile device such as a smartphone or tablet computer collectively indicated as mobile hand-held device 72. Mobile hand-held device 72 can be provided with a software monitoring application 98 that includes tables 62 having data related to determination of a desired methane gas output flow rate. The self-regulating LFG wellhead gas flow control valve 30 maintains consistent operations for the periods of time between manual setting adjustments by a human operator. A basis for the self-regulation control scheme can be to maintain constant LFG flow rate, or a constant level of vacuum applied to the well head assembly 12 or some combination of flow rate/vacuum and other site specific data (such as barometric pressure, ambient air temperature, etc.). A third basis of control can be a series of selectable control profiles of combinations of vacuum and/or LFG flow which are chosen to match the needs of a particular well head assembly 12, such as keeping the LFG flow rate below 5 scfm but above 1 scfm, or not exceeding a set upper or lower vacuum limit.

Figure 12:
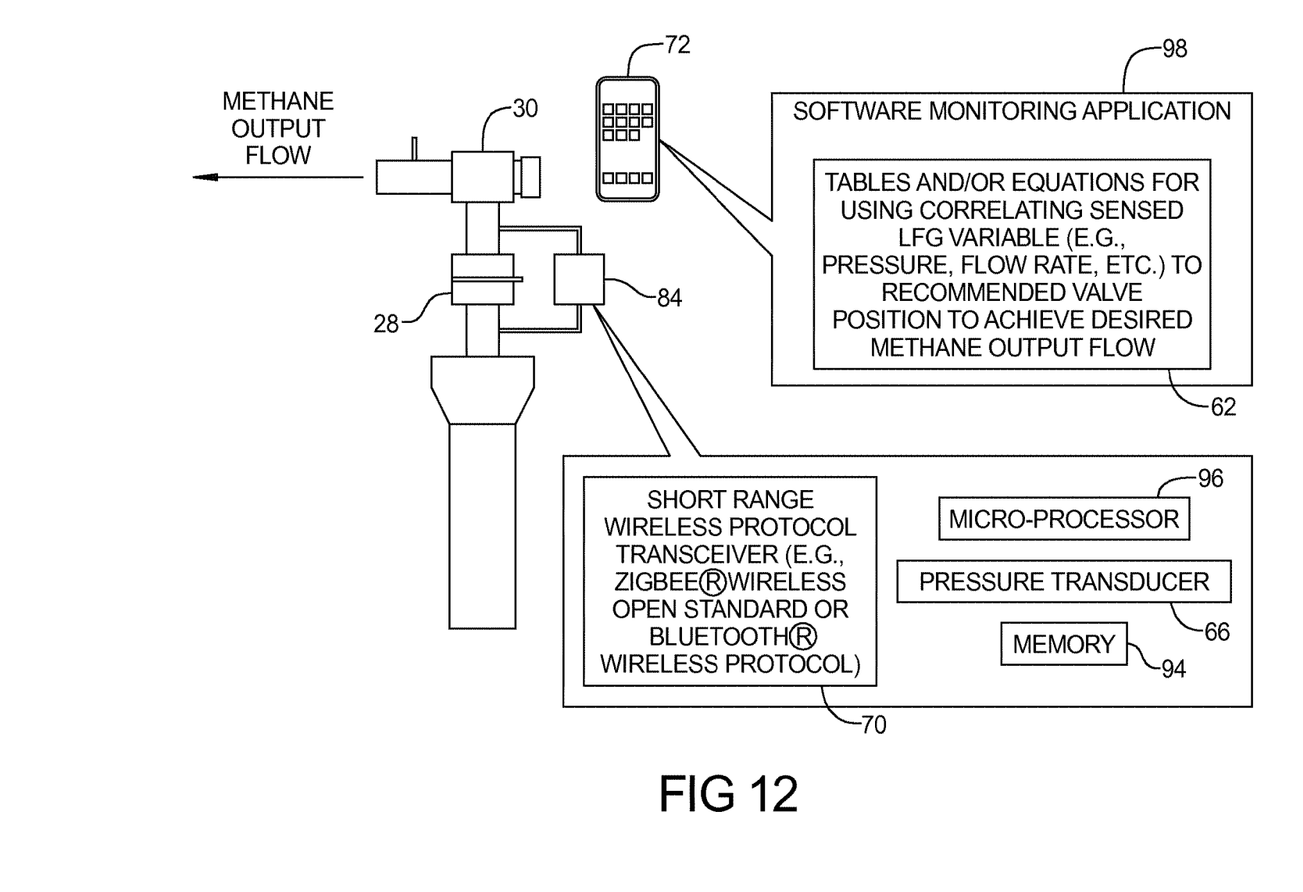
FIG. 12 is a diagram of components for a well head assembly and control valve of the present disclosure.

One control loop logic approach for any of the above aspects is for the self-regulating LFG wellhead gas flow control valve 30 to have microprocessor 96 periodically, such as 1-12 times daily which is user settable, evaluate the current LFG flow rate, temperature and/or vacuum applied to the well head assembly 12. If the current readings are within predetermined bounds of the desired settings then no changes are made, the process is repeated at the next set interval. If the current readings are found to lie outside the bounds of the desired settings, the microprocessor 96 logic will "hunt" via directing slight, stepwise openings and/or closings of the control valve 30, take new measurements, then adjust again until the new control valve setting achieves readings that are within the bounds of the desired settings.

According to additional aspects, a keypad and digital display is provided at the well head 14 to enter the desired control target settings and display sensor readings. According to further aspects, a smartphone or tablet such as mobile hand-held device 72 is used to communicate control target settings and readings via a Bluetooth® protocol communications signal or other local wireless signal.

Another control loop logic approach for any of the above aspects is to use the following control logic scheme within the wellhead self-regulating LFG gas flow control valve 30: 1) periodically, such as 1-12 times daily, "hunt" via directing slight, stepwise openings and closings of gas flow control valve 30, then 2) pausing while taking new measurements, while computing the following ratio: an additional LFG flow rate gained divided by a change in vacuum level applied to the well head assembly 12. As an example, when using integral or stepwise openings of the control valve 30, at some point any additional opening of gas flow control valve 30 can result in higher levels of vacuum applied to the LFG well head assembly 12, but provide a lowered increase in the LFG flow rate than achieved in the prior stepwise openings. One explanation for this is that the current LFG well production capacity has been exceeded in terms of flow rate of high methane content LFG, defined for example as LFG content of over 50% methane. Applying additional, higher levels of vacuum beyond this point may draw additional gas flow, but this additional flow can be from undesirable near and distant leaks in the landfill cap, well casing, piping and connections. Therefore, the purpose of this control logic scheme is to open the LFG control valve at the wellhead until a selected or predetermined limit of gas flow/applied vacuum level has been achieved.

Additional variations of the systems described in reference to FIGS. 1-12 include providing a "trim" capability, whereby the operator selects a bias in a final valve position setting to achieve a desired objective for a particular well. This can include biasing toward lower LFG flow rates and/or lower levels of applied vacuum for LFG wells at the perimeter of the landfill, to avoid pulling ambient air into the LFG well and hence the collection system. Such ambient air intrusion dilutes the desired methane concentration, and/or can impair the desired activity level of the anaerobic microorganisms that produce the methane by digesting the organic materials within the landfill. Conversely, a trim setting desired for wells near a center of the landfill may be biased toward slightly higher LFG flow rates and/or higher levels of applied vacuum, to ensure that all produced gases are collected and to reduce emissions into the atmosphere of organic and/or odor-causing compounds.

In addition, a self-regulating gas flow control valve 30 as described in reference to FIGS. 2, 3, 4 and 9 can further include an O2 (oxygen) sensor 100 which by monitoring allows the operator to keep O2 level below a desired set-point. This avoids air entrainment which occurs by over-drawing or exceeding a maximum LFG flow rate of the well.

Figure 13:
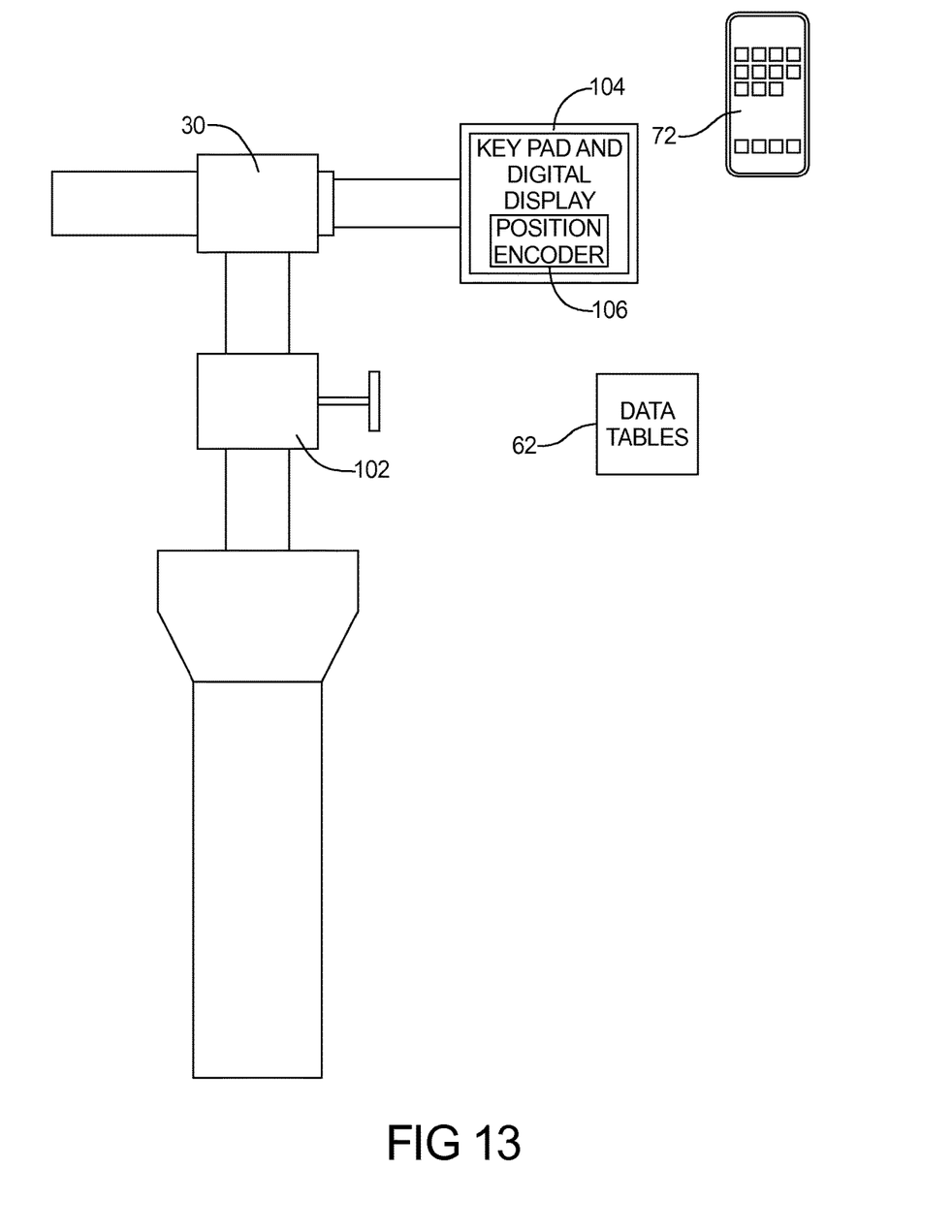
FIG. 13 is a front elevational view of a well head assembly and control valve control/operating system modified from FIG. 2.

Referring to FIG. 13, the self-regulating gas flow control valve 30 as described in reference to FIGS. 2-5 can use a fine flow control valve 102 in place of the LFG pressure drop measurement device 52, thereby also replacing separate elements such as the orifice assembly 28. A stored family of curves provided in table 62 is used to correlate pressure differential readings across the control valve 102 to a gas flow rate by ascertaining a setting of the control valve. One variation of the above is to include a keypad and digital display 104 on the gas flow control valve 30 to enter valve position settings and display sensor readings. Another aspect uses a smartphone or tablet such as mobile hand-held device 72 to communicate settings and readings via a Bluetooth® protocol communications signal or other local wireless signal. In a further aspect a position encoder 106 is provided to indicate the valve position of gas flow control valve 30 to correctly index the pressure drop to stored flow data.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-regulating, landfill gas well control system for automatically controlling a flow of landfill gas (LFG) through an above ground level wellhead associated with a landfill well at a landfill, the system comprising:
    a combination unit coupled to and supported by the wellhead at a position above a ground level surface, the combination unit having:
    a housing adapted to be operably supported from the wellhead;
    an electronically controlled valve actuator disposed within the housing for controlling a LFG flow control valve, to thus control a LFG flow through the wellhead;
    a measurement element disposed within the housing and secured directly to a pipe of the wellhead through which the LFG is flowing, for measuring a parameter which affects the LFG flow through the wellhead;

a controller disposed within the housing for electronically controlling the electronically controlled valve actuator, based on LFG gas flow data obtained using the measurement element, to adjust a setting of the LFG flow control valve to obtain a specific control point setting for LFG flow, and to automatically maintain the control point setting; and a wireless transceiver operably associated with the controller and disposed within the housing, configured to enable wireless communication between a remote subsystem and the controller.

2. The system of claim 1, wherein the measurement element comprises an orifice element for enabling a differential pressure across the orifice element to be determined.

3. The system of claim 2, wherein the orifice element comprises at least one of:
an orifice plate; or
a pitot tube.

4. The system of claim 1, wherein the wireless transceiver disposed within the combination unit comprises a short range wireless protocol transceiver for wirelessly communicating with an external mobile electronic device.

5. The system of claim 1, wherein the combination unit further comprises a pressure transducer.

6. The system of claim 1, further comprising a mobile hand held electronic device including at least one table for correlating a sensed LFG variable to a recommended valve position for the LFG flow control valve.

7. The system of claim 6, wherein the wireless transceiver within the combination unit wirelessly communicates with the mobile hand held electronic device.

8. The system of claim 1, wherein the wireless transceiver is configured to receive wireless signals from a remote source to enable control by the controller of the LFG flow control valve by the electronically controlled valve actuator.

9. The system of claim 8, wherein the controller is configured to implement at least one of the following schemes:
a scheme to maintain a constant LFG flow rate;
a scheme to maintain a constant level of vacuum applied to the well head;
a scheme to maintain a desired combination of LFG flow rate and vacuum; or
a scheme to maintain a desired combination of LFG flow rate and vacuum, also taking into consideration at least one of barometric pressure and ambient air temperature.

10. The system of claim 1, wherein the system wirelessly accesses a cloud based data source, using the wireless transceiver, for obtaining historical, LFG flow related data associated with the wellhead.

11. The system of claim 6, wherein the mobile hand held electronic device includes:
LFG data including LFG well head vacuum and pressure, LFG gas quality data, LFG gas temperature; and
site and ambient data readings including at least one of:
barometric pressure;
air temperature; and
a geospatial location of a LFG well head.

12. The system of claim 1, wherein the wireless transceiver of the combination unit is responsive to at least one of:
satellite signals; or
cellular signals.

13. A self-regulating, landfill well control system for automatically controlling a parameter associated with an above ground level located wellhead associated with a landfill well at a landfill, and where a landfill gas (LFG) is flowing through the wellhead, the system comprising:
a combination unit having a housing and operably coupled to and physically supported from the wellhead at a location above the ground level, the combination unit having:
an electronically controlled valve actuator within the housing for controlling a LFG flow control valve, to thus control a LFG flow through the wellhead;
a measurement element disposed within the housing operably associated for measuring the parameter to be controlled;
a pressure transducer for measuring pressure within the wellhead;
a controller for controlling the electronically controlled valve actuator, based on measurements obtained using the measurement element and the pressure transducer, to adjust a setting of the LFG flow control valve to achieve a desired control point setting for the parameter, and to automatically adjust the LFG flow control valve as needed to maintain the desired control point setting for the parameter; and
a wireless transceiver operably associated with the controller for wirelessly receiving at least one of data and commands from a remote subsystem which assist the controller in controlling the electronically controlled valve actuator.

14. The system of claim 13, wherein the parameter comprises LFG flow.

15. The system of claim 13, wherein the parameter comprises vacuum applied to the wellhead from an external vacuum source.

16. The system of claim 13, wherein the parameter is a combination of at least two of LFG flow, vacuum, barometric pressure and ambient air temperature.

17. A method for forming a self-regulating, landfill well control system for automatically controlling a parameter associated with an above ground level wellhead associated with a landfill well at a landfill, and where a landfill gas (LFG) is flowing through the wellhead, the method comprising:
using an electronically controlled valve actuator to control a LFG flow control valve, to thus control a LFG flow through the wellhead;
using a measurement element operably associated with the wellhead to measure the parameter to be controlled; and
using a combination unit having a housing, the housing being coupled to and physically supported from the wellhead above the ground level, and including a controller and a wireless transceiver in communication with the controller, both the controller and the wireless transceiver being housed within the housing, the controller controlling the electronically controlled valve actuator based on data obtained using the measurement element, and adjusting a setting of the LFG flow control valve to achieve a desired control point setting for the parameter; and
the controller automatically controlling the electronically controlled valve actuator to adjust the LFG flow control valve as needed to maintain the desired control point setting for the parameter.

18. The method of claim 17, wherein the operation of using a measurement element to measure the parameter to be controlled comprises using a measurement element to measure at least one of:
- LFG flow through the wellhead;
- vacuum at the wellhead; or
- a combination of at least two of LFG flow, vacuum, barometric pressure and ambient air temperature.

* * * * *